United States Patent
Hong et al.

(10) Patent No.: US 10,567,169 B2
(45) Date of Patent: Feb. 18, 2020

(54) APPARATUS AND METHOD FOR MULTI-USER QUANTUM KEY DISTRIBUTION

(71) Applicant: ELECTRONICS AND TELECOMMUNICATIONS RESEARCH INSTITUTE, Daejeon (KR)

(72) Inventors: Changho Hong, Seoul (KR); Nayoung Kim, Seoul (KR); Osung Kwon, Daejeon (KR); Younchang Jeong, Ulsan (KR); Haeng-Seok Ko, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 397 days.

(21) Appl. No.: 15/434,188

(22) Filed: Feb. 16, 2017

(65) Prior Publication Data
US 2018/0069698 A1 Mar. 8, 2018

(30) Foreign Application Priority Data
Sep. 6, 2016 (KR) .................. 10-2016-0114646

(51) Int. Cl.
H04L 9/08 (2006.01)
H04L 9/14 (2006.01)

(52) U.S. Cl.
CPC ............ *H04L 9/0858* (2013.01); *H04L 9/083* (2013.01); *H04L 9/0869* (2013.01); *H04L 9/14* (2013.01)

(58) Field of Classification Search
CPC ..... H04L 9/0858; H04L 9/083; H04L 9/0869; H04L 9/14; H04L 9/0852; H04L 9/00
See application file for complete search history.

(56) References Cited

U.S. PATENT DOCUMENTS

| | | |
|---|---|---|
| 7,496,203 B2 | 2/2009 | Choi et al. |
| 7,649,996 B2 | 1/2010 | Nishioka et al. |
| 8,885,828 B2 | 11/2014 | Wiseman et al. |

(Continued)

FOREIGN PATENT DOCUMENTS

| | | |
|---|---|---|
| KR | 10-2004-0058326 A | 7/2004 |
| KR | 10-0596404 B1 | 7/2006 |

(Continued)

*Primary Examiner* — Paul E Callahan
(74) *Attorney, Agent, or Firm* — LRK Patent Law Firm

(57) ABSTRACT

An apparatus and method for multi-user quantum key distribution. The method for multi-user quantum key distribution is performed using a multi-user quantum key distribution apparatus and a quantum key client device, and includes generating, by the multi-user quantum key distribution apparatus, transmission qubit pairs based on a key bit string of a shared key to be distributed to the quantum key client device, measuring, by the quantum key client device, the transmission qubit pairs, received from the multi-user quantum key distribution apparatus through a quantum channel, based on a measurement basis, verifying security of the quantum channel using the transmission qubit pairs, and if the security has been verified, decoding qubit measurement values of the transmission qubit pairs into the shared key.

19 Claims, 12 Drawing Sheets

(56) References Cited

U.S. PATENT DOCUMENTS

2005/0157875 A1* 7/2005 Nishioka ............... H04B 10/70
                                                      380/46
2014/0068765 A1   3/2014 Choi et al.

FOREIGN PATENT DOCUMENTS

| KR | 10-2012-0071883 A | 7/2012 |
| KR | 10-1351012 B1 | 1/2014 |
| KR | 10-2014-0054647 A | 5/2014 |
| KR | 10-2014-0060022 A | 5/2014 |

* cited by examiner

| KEY VALUE | QUBIT GENERATION BASIS | GENERATED QUBIT | MEASUREMENT BASIS $a_i$ (SEQUENCE IS RANDOMLY SELECTED) | MEASUREMENT RESULT VALUE |
|---|---|---|---|---|
| 0 | RECTILINEAR | $\|0\rangle$ | RECTILINEAR $a_i^1=0$ | $\|0\rangle$ |
| | | $\|0\rangle$ | DIAGONAL $a_i^2=1$ | $\|+\rangle, \|-\rangle$ |
| 0 | DIAGONAL | $\|+\rangle$ | DIAGONAL $a_i^1=1$ | $\|+\rangle$ |
| | | $\|+\rangle$ | RECTILINEAR $a_i^2=0$ | $\|0\rangle, \|1\rangle$ |
| 1 | RECTILINEAR | $\|1\rangle$ | RECTILINEAR $a_i^1=0$ | $\|1\rangle$ |
| | | $\|1\rangle$ | DIAGONAL $a_i^2=1$ | $\|+\rangle, \|-\rangle$ |
| 1 | DIAGONAL | $\|-\rangle$ | DIAGONAL $a_i^1=1$ | $\|-\rangle$ |
| | | $\|-\rangle$ | RECTILINEAR $a_i^2=0$ | $\|0\rangle, \|1\rangle$ |

FIG. 2

| KEY VALUE | QUBIT GENERATION BASIS | GENERATED QUBIT | MEASUREMENT BASIS $a_i$ (SEQUENCE IS RANDOMLY SELECTED) | MEASUREMENT RESULT VALUE |
|---|---|---|---|---|
| D | DIAGONAL | $|0\rangle$ | RECTILINEAR $a_i^1=0$ | $|0\rangle, |1\rangle$ |
|  | DIAGONAL | $|1\rangle$ | DIAGONAL $a_i^2=1$ | $|-\rangle$ |
| D | RECTILINEAR | $|1\rangle$ | DIAGONAL $a_i^1=1$ | $|+\rangle, |-\rangle$ |
|  | RECTILINEAR | $|0\rangle$ | RECTILINEAR $a_i^2=0$ | $|0\rangle$ |
| D | DIAGONAL | $|+\rangle$ | DIAGONAL $a_i^1=1$ | $|+\rangle$ |
|  | DIAGONAL | $|-\rangle$ | RECTILINEAR $a_i^2=0$ | $|0\rangle, |1\rangle$ |
| D | DIAGONAL | $|-\rangle$ | RECTILINEAR $a_i^1=0$ | $|0\rangle, |1\rangle$ |
|  | DIAGONAL | $|+\rangle$ | DIAGONAL $a_i^2=1$ | $|+\rangle$ |
| D | RECTILINEAR | $|0\rangle$ | DIAGONAL $a_i^1=1$ | $|+\rangle, |-\rangle$ |
|  | DIAGONAL | $|+\rangle$ | RECTILINEAR $a_i^2=0$ | $|0\rangle, |1\rangle$ |
| D | RECTILINEAR | $|0\rangle$ | RECTILINEAR $a_i^1=0$ | $|0\rangle$ |
|  | DIAGONAL | $|-\rangle$ | DIAGONAL $a_i^2=1$ | $|-\rangle$ |

FIG. 3A

| KEY VALUE | QUBIT GENERATION BASIS | GENERATED QUBIT | MEASUREMENT BASIS $a_i^j$ (SEQUENCE IS RANDOMLY SELECTED) | MEASUREMENT RESULT VALUE |
|---|---|---|---|---|
| D | RECTILINEAR | $|1\rangle$ | DIAGONAL $a_i^1=1$ | $|+\rangle, |-\rangle$ |
| | DIAGONAL | $|+\rangle$ | RECTILINEAR $a_i^2=0$ | $|0\rangle, |1\rangle$ |
| D | RECTILINEAR | $|1\rangle$ | RECTILINEAR $a_i^1=0$ | $|1\rangle$ |
| | DIAGONAL | $|-\rangle$ | DIAGONAL $a_i^2=1$ | $|-\rangle$ |
| D | DIAGONAL | $|+\rangle$ | RECTILINEAR $a_i^1=0$ | $|0\rangle, |1\rangle$ |
| | RECTILINEAR | $|0\rangle$ | DIAGONAL $a_i^2=1$ | $|+\rangle, |-\rangle$ |
| D | DIAGONAL | $|+\rangle$ | DIAGONAL $a_i^1=1$ | $|+\rangle$ |
| | RECTILINEAR | $|1\rangle$ | RECTILINEAR $a_i^2=0$ | $|1\rangle$ |
| D | DIAGONAL | $|-\rangle$ | RECTILINEAR $a_i^1=0$ | $|0\rangle, |1\rangle$ |
| | RECTILINEAR | $|0\rangle$ | DIAGONAL $a_i^2=1$ | $|+\rangle, |-\rangle$ |
| D | DIAGONAL | $|-\rangle$ | DIAGONAL $a_i^1=1$ | $|-\rangle$ |
| | RECTILINEAR | $|1\rangle$ | RECTILINEAR $a_i^2=0$ | $|0\rangle$ |

FIG. 3B

| | CONFIGURATION OF TRANSMISSION QUBIT PAIR | SHARED KEY |
|---|---|---|
| USER 1 | D $\sigma_z^0$ $\sigma_z^1$ D D $\sigma_z^0$ D $\sigma_x^0$ $\sigma_z^1$ D D D $\sigma_x^0$ | |
| USER 2 | $\sigma_x^0$ D $\sigma_z^1$ $\sigma_z^0$ D $\sigma_x^0$ D D D $\sigma_x^1$ D $\sigma_z^0$ D | 0 1 0 0 1 0 |
| USER 3 | D D D $\sigma_z^0$ D $\sigma_z^1$ $\sigma_x^0$ $\sigma_z^0$ D D $\sigma_z^1$ $\sigma_x^0$ | |
| ⋮ | ⋮ | |

APPARATUS AND METHOD FOR MULTI-USER QUANTUM KEY DISTRIBUTION

CROSS REFERENCE TO RELATED APPLICATION

This application claims the benefit of Korean Patent Application No. 10-2016-0114646, filed Sep. 6, 2016, which is hereby incorporated by reference in its entirety into this application.

This work was supported by the ICT R&D program of MSIP/IITP[1711028311, Reliable crypto-system standards and core technology development for secure quantum key distribution network] and the R&D Convergence program of NST (National Research Council of Science and Technology) of Republic of Korea (Grant No. CAP-18-08-KRISS).

BACKGROUND OF THE INVENTION

1. Technical Field

The present invention relates generally to quantum communication technology and, more particularly, to quantum key distribution technology.

2. Description of the Related Art

Since conventional quantum key distribution techniques are designed to distribute a key only to a single user, they are not appropriate for achieving the object of distributing the same random key to a plurality of users.

However, in an actual key distribution environment, there are many cases where the same key is distributed to a plurality of users and is then used for the encryption systems of the users. A representative example of such encryption systems is an encryption system in which only users who are provided with the same key are capable of performing secure communication.

For example, conventional BB84-based quantum key distribution is a technique for guaranteeing secure key distribution between two users. For multi-user communication, when key distribution targets are extended to two or more users, the efficiency of distribution of the same random key is greatly deteriorated.

In order to solve this problem, conventional quantum key distribution techniques perform classical calculation and classical key distribution methods in a combined manner.

Meanwhile, Korean Patent No. 10-0596404 entitled "Quantum Key Distribution Method between Multiusers or Various Groups" discloses a method for generating a group key by preparing a number of multi-qubit entanglement states identical to the number of users connected to a center.

However, technology in Korean Patent No. 10-0596404 is difficult to actually implement from the standpoint of the use of multi-qubit entanglement states.

SUMMARY OF THE INVENTION

Accordingly, the present invention has been made keeping in mind the above problems occurring in the prior art, and an object of the present invention is to distribute the same key to multiple users using a quantum technique, the security of which is proven.

Another object of the present invention is to guarantee constant key distribution efficiency, regardless of the number of users to whom the same key is to be distributed.

A further object of the present invention is to distribute the same key to multiple users in an actual key distribution environment by facilitating implementation using stable efficiency and a single qubit.

In accordance with an aspect of the present invention to accomplish the above objects, there is provided a method for multi-user quantum key distribution, the method being performed using a multi-user quantum key distribution apparatus and a quantum key client device, the method including generating, by the multi-user quantum key distribution apparatus, transmission qubit pairs based on a key bit string of a shared key to be distributed to the quantum key client device; measuring, by the quantum key client device, two qubits of each of the transmission qubit pairs, received from the multi-user quantum key distribution apparatus through a quantum channel, based two different measurement bases; verifying security of the quantum channel using verification qubit pairs in the transmission qubit pairs; and if the security has been verified, decoding measurement values of one qubit, in which a generation basis and a measurement basis are identical, in each transmission qubit pair into the shared key.

The method using the multi-user quantum key distribution apparatus and the quantum key client device may include generating, by the multi-user quantum key distribution apparatus, transmission qubit pairs based on a key bit string of a shared key to be distributed to the quantum key client device; measuring, by the quantum key client device, two respective qubits of each transmission qubit pair received from the multi-user quantum key distribution apparatus through a quantum channel in two different measurement bases; verifying security of the quantum channel using verification qubit pairs in the transmission qubit pair, and if the security is verified, decoding measurement values of one qubit, in which a generation basis is identical to a measurement basis, in each transmission qubit pair, into the shared key.

Generating the key qubit pairs may be configured to generate key qubit pairs, each including two identical key qubits for each key bit in the key bit string.

Generating the key qubit pairs may be configured to determine the two identical key qubits included in each key qubit pair based on both key values of the key bits and a generation basis corresponding to any one of a rectilinear basis and a diagonal basis.

Generating the key qubit pairs may be configured to determine an arrangement sequence of the generated key qubit pairs depending on an arrangement sequence of the key bits in the key bit string.

Generating the verification qubit pairs may be configured such that a number of transmission qubit pairs is greater than a number of key bits, and a number of verification qubit pairs to be generated is determined using a difference between the number of transmission qubit pairs and the number of key bits.

Generating the transmission qubit pairs based on the key qubit pairs and the verification qubit pairs may be configured to generate the transmission qubit pairs by arranging the verification qubit pairs at any one of arrangement locations respectively adjacent to the key qubit pairs and arrangement locations respectively adjacent to previously arranged verification qubit pairs.

Generating the transmission qubit pairs based on the key qubit pairs and the verification qubit pairs may be configured such that the multi-user quantum key distribution apparatus stores arrangement locations of the key qubit pairs and the verification qubit pairs arranged in each of the transmission qubit pairs.

Measuring the two qubits of each of the transmission qubit pairs may include receiving the generated transmission qubit pairs through the quantum channel; measuring the received transmission qubit pair in different measurement bases; and storing qubit measurement values of the transmission qubit pair.

Receiving the generated transmission qubit pairs may be configured such that the quantum key client device may receive arrangement locations and sequences of the key qubit pairs and the verification qubit pairs arranged in each of the transmission qubit pairs from the multi-user quantum key distribution apparatus.

Measuring the received transmission qubit pairs in different measurement bases may be configured such that the quantum key client device measures two qubits forming each transmission qubit pair by randomly selecting a sequence of the rectilinear measurement basis and the diagonal measurement basis.

Storing the qubit measurement values may be configured such that the quantum key client device stores the qubit measurement values that include both result values obtained by measuring each transmission qubit pair in the rectilinear basis and result values obtained by measuring each transmission qubit pair in the diagonal basis.

Verifying the security may be configured such that the multi-user quantum key distribution apparatus discloses states of verification qubits included in each transmission qubit pair, arrangement locations of the verification qubits, and a generation basis used to generate the verification qubits to the quantum key client device through a classical channel.

Verifying the security may be configured such that the quantum key client device determines, based on a comparison, whether measurement values in a measurement basis identical to the generation basis are identical to verification qubits, using the disclosed verification qubits, the arrangement locations of the disclosed verification qubits, and the generation basis of the disclosed verification qubits.

Verifying the security may be configured to, if it is determined that the qubit measurement results are identical to states of the verification qubits disclosed by the distribution apparatus, verify that the quantum channel is secure as a result of verification of security of the quantum channel.

Decoding the qubit measurement values may be configured such that, if it is verified that the quantum channel is secure as a result of verification of security of the quantum channel, the multi-user quantum key distribution apparatus discloses arrangement locations of key qubit pairs included in the transmission qubit pair and a generation basis used to generate the key qubit pairs to the quantum key client device through the classical channel.

Decoding the qubit measurement values may be configured such that, based on the disclosed arrangement locations of the key qubit pairs and the disclosed generation basis of the key qubit pairs, the quantum key client device decodes result values measured in a measurement basis identical to the generation basis into the key bit string of the shared key.

In accordance with another aspect of the present invention to accomplish the above objects, there is provided an apparatus for multi-user quantum key distribution, including a quantum random number generation unit for randomly generating a key bit string of a shared key to be distributed to quantum key client devices, based on quantum states; a qubit generation unit for generating transmission qubit pairs based on the key bit string; a qubit transmission unit for transmitting the transmission qubit pairs to the quantum key client device through a quantum channel; and a classical signal transmission/reception unit for disclosing information related to the transmission qubit pairs through a classical channel.

In accordance with a further aspect of the present invention to accomplish the above objects, there is provided a quantum key client device, including a qubit measurement unit for measuring transmission qubit pairs, received from a multi-user quantum key distribution apparatus through a quantum channel, based on a measurement basis; a quantum random number generation unit for selecting a sequence of measurement bases based on quantum states; a classical signal transmission/reception unit for receiving pieces of information related to the transmission qubit pairs through a classical channel; and a measurement result processing unit for determining, based on a comparison, whether the pieces of information related to the transmission qubit pairs are identical to qubit measurement values obtained by measuring the transmission qubit pairs, for verifying security of the quantum channel, and for decoding the qubit measurement values into a key bit string of a shared key to be distributed by the multi-user quantum key distribution apparatus.

BRIEF DESCRIPTION OF THE DRAWINGS

The above and other objects, features and advantages of the present invention will be more clearly understood from the following detailed description taken in conjunction with the accompanying drawings, in which:

FIG. 2 is a table showing key qubit pairs according to an embodiment of the present invention;

FIGS. 3A and 3B are tables showing verification qubit pairs according to embodiments of the present invention;

FIG. 4 is a table showing transmission qubit pairs according to an embodiment of the present invention;

DESCRIPTION OF THE PREFERRED EMBODIMENTS

Figure 1:
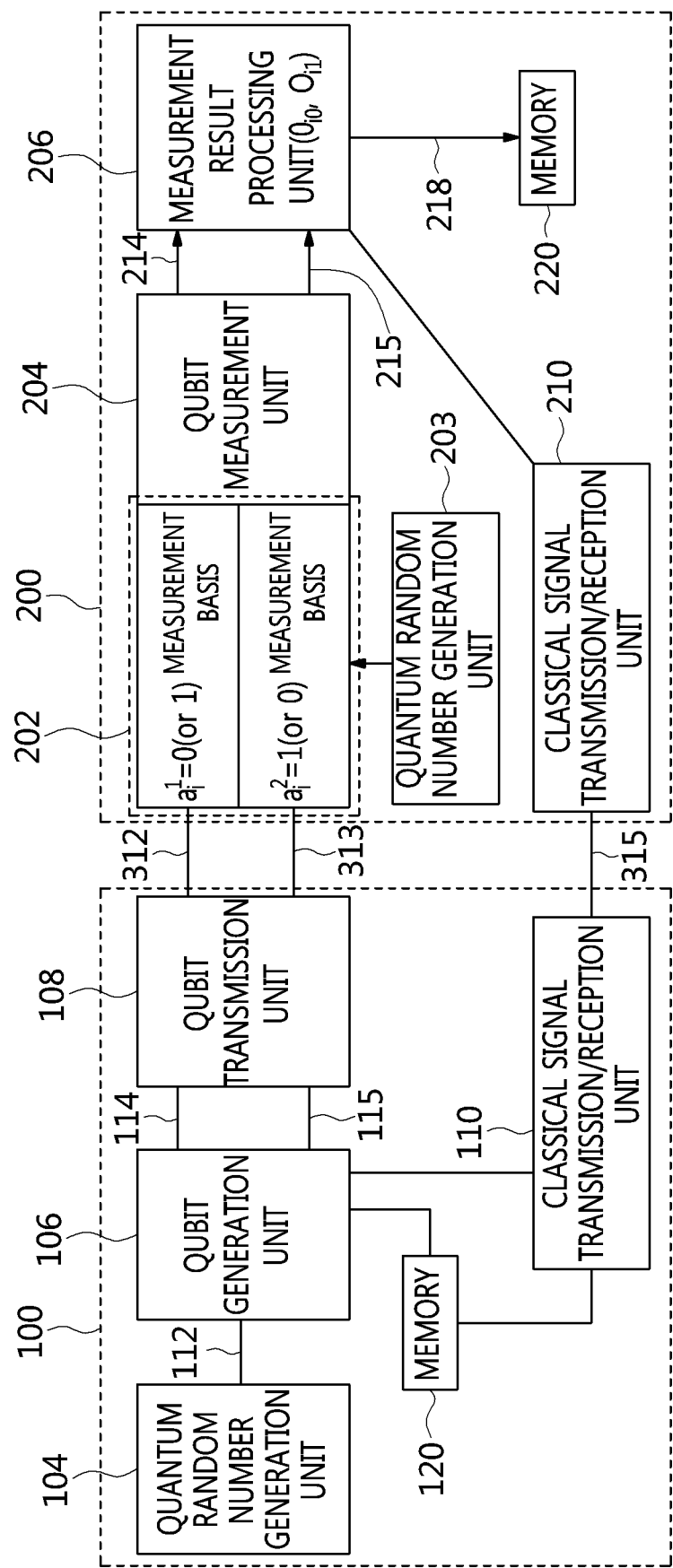
FIG. 1 is a block diagram of an apparatus for multi-user quantum key distribution according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 5:
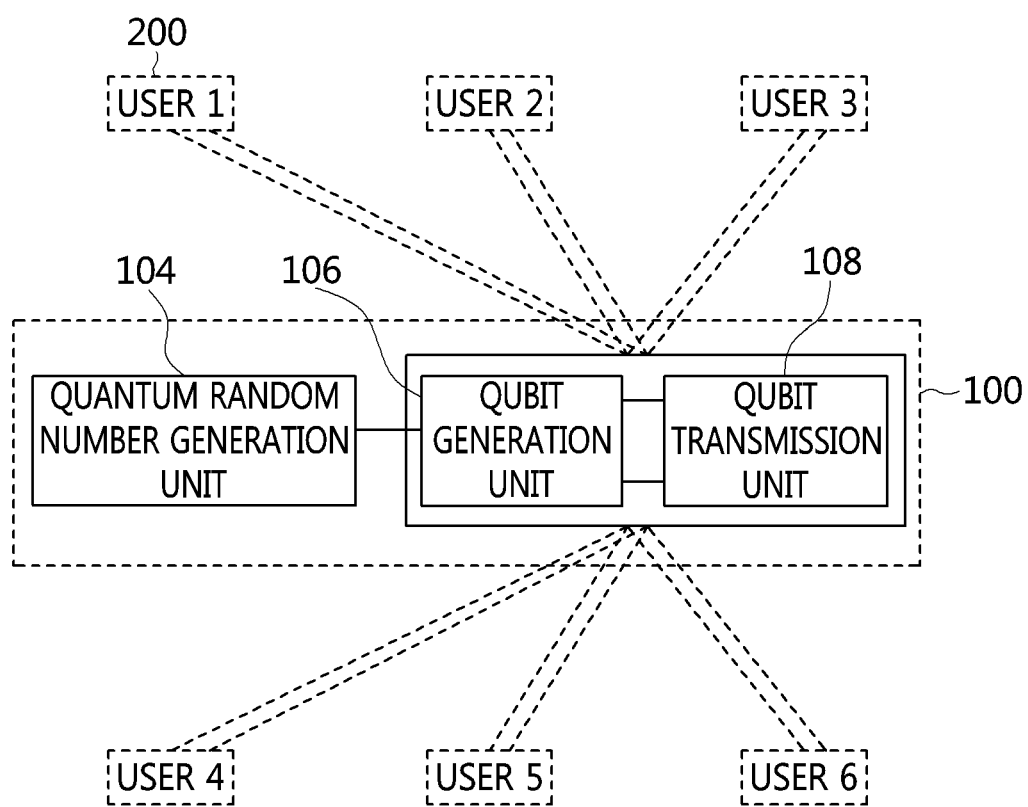
FIG. 5 is a diagram illustrating the distribution of the same key by the apparatus for multi-user quantum key distribution according to an embodiment of the present invention.

FIG. 1 is a block diagram of an apparatus for multi-user quantum key distribution according to an embodiment of the present invention. FIG. 2 is a table showing key qubit pairs according to an embodiment of the present invention. FIGS. 3A and 3B are tables showing verification qubit pairs according to embodiments of the present invention. FIG. 4 is a table showing transmission qubit pairs according to an embodiment of the present invention. FIG. 5 is a diagram illustrating the distribution of the same key by the apparatus for multi-user quantum key distribution according to an embodiment of the present invention.

Referring to FIG. 1, an apparatus 100 for multi-user quantum key distribution (hereinafter referred to as a "multi-user quantum key distribution apparatus 100") and a quantum key client device 200 according to an embodiment of the present invention are illustrated.

The multi-user quantum key distribution apparatus 100 includes a quantum random number generation unit 104, a qubit generation unit 106, a qubit transmission unit 108, a classical signal transmission/reception unit 110, and memory 120.

The quantum random number generation unit 104 may generate a key bit string of a shared key to be distributed to the quantum key client device 200 based on quantum states.

Here, the quantum random number generation unit 104 may randomly generate a key bit string based on quantum properties.

The qubit generation unit 106 may generate transmission qubit pairs based on both the key bit string and the quantum random number generation unit 104.

Here, the qubit generation unit 106 may generate key qubit pairs based on the key bit string of the shared key.

The qubit generation unit 106 may generate a pair of two identical key qubits $(|\psi\rangle_{k_i}, |\psi\rangle_{k_i})$ for one bit. Here the subscript i is a sequence pair number. The generated key qubit pair may be separated into two types according to the generation basis. When the generation basis is a rectilinear basis, qubits capable of being generated may be $|0\rangle$ and $|1\rangle$, and when the generation basis is a diagonal basis, qubits capable of being generated may be $|+\rangle$ and $|-\rangle$.

That is, the qubit generation unit 106 may generate key qubit pairs, each including two identical key qubits for each key bit in the key bit string.

The qubit generation unit 106 may determine two identical key qubits included in each key qubit pair based on the key value of each key bit and the generation basis corresponding to any one of the rectilinear basis and the diagonal basis.

In order to share a key value of '0' in a key bit, the multi-user quantum key distribution apparatus 100 may prepare a key qubit pair of $(|0\rangle,|0\rangle)$ or $(|+\rangle,|+\rangle)$ and transmit the key qubit pair to the quantum key client device 200. In order to share a key value of '1' in a key bit, the multi-user quantum key distribution apparatus 100 may prepare a key qubit pair of $(|1\rangle,|1\rangle)$ or $(|-\rangle,|-\rangle)$ and transmit the key qubit pair to the quantum key client device 200.

Here, the qubit generation unit 106 may determine the sequence of arrangement of the generated key qubit pairs depending on the sequence of arrangement of key bits in the key bit string.

Further, the qubit generation unit 106 may generate verification qubit pairs.

In this case, the qubit generation unit 106 may be configured such that the number of transmission qubit pairs desired to be transmitted is greater than the number of key bits, and may determine the number of verification qubit pairs to be generated using the difference between the number of transmission qubit pairs and the number of key qubit pairs.

In this case, when the number of key qubit pairs that is desired to be shared is n and the number of transmission qubit pairs to be transmitted is N, as given in Equation (1), the relationship N>n may be satisfied. Here, the difference c between N and n may be the number of verification qubit pairs. N−n=c may be the number of verification qubit pairs used to verify the security of channels.

$$|\psi\rangle_{k_i} = \{|0\rangle, |1\rangle, |+\rangle, |-\rangle\}, i=1,2,\ldots,n \quad (1)$$

Here, the qubit generation unit 106 may generate c verification qubit pairs.

$$(|\psi\rangle_{d_{2j-1}}, |\psi\rangle_{d_{2j}}) \quad (2)$$

In this case, as shown in Equation (2), $|\psi\rangle_{d_{2j-1}}$ or $|\psi\rangle_{d_{2j}}$ $\in \{|0\rangle, |1\rangle, |+\rangle, |-\rangle\}$ satisfied.

That is, unlike the key qubit pair $(|\psi\rangle_{k_i}, |\psi\rangle_{k_i})$ in Equation (1), for two verification qubits forming each of c verification qubit pairs, each generated using 2c qubits, different states and different basis states may be possible. These may be given in the following Equation (3) and the following Table 1.

$$(|\psi\rangle_{d_{2j-1}}, |\psi\rangle_{d_{2j}}) \in \{(|0\rangle,|1\rangle),(|1\rangle,|0\rangle),(|+\rangle,|-\rangle),(|-\rangle,|+\rangle),(|0\rangle,|+\rangle),(|0\rangle,|-\rangle),(|1\rangle,|+\rangle),(|1\rangle,|-\rangle),|+\rangle,|0\rangle),(|-\rangle,|1\rangle),(|-\rangle,|0\rangle),(|-\rangle,|1\rangle)\} \quad (3)$$

TABLE 1

| Same basis | Different bases | |
|---|---|---|
| $(|0\rangle,|1\rangle)$ | $(|0\rangle,|+\rangle)$ | $(|+\rangle,|0\rangle)$ |
| $(|1\rangle,|0\rangle)$ | $(|0\rangle,|-\rangle)$ | $(|+\rangle,|1\rangle)$ |
| $(|+\rangle,|-\rangle)$ | $(|1\rangle,|+\rangle)$ | $(|-\rangle,|0\rangle)$ |
| $(|-\rangle,|+\rangle)$ | $(|1\rangle,|-\rangle)$ | $(|-\rangle,|1\rangle)$ |

Referring to FIGS. 2, 3A and 3B, examples of the configuration of key qubit pairs and verification qubit pairs according to an embodiment of the present invention are illustrated.

Further, the qubit generation unit 106 may generate transmission qubit pairs.

Here, the qubit generation unit 106 may generate transmission qubit pairs by randomly arranging respective verification qubit pairs at any one of arrangement locations respectively adjacent to the key qubit pairs and arrangement locations respectively adjacent to the previously arranged verification qubit pairs.

Referring to FIG. 4, examples of configuration of a transmission qubit pair according to an embodiment of the present invention may be illustrated.

$\sigma_z^k$ indicates that k bits have been prepared in a rectilinear basis, and $\sigma_x^k$ indicates that k bits have been prepared in a diagonal basis. Here, k is a bit value, which may have a value of 0 or 1. For example, $\sigma_x^1$ may be the state of $|-\rangle$. D may be the verification qubit pair shown in FIGS. 3A and 3B. Verification qubit pairs may be randomly inserted into key qubit pairs, thus enabling intervention by an attacker into a channel to be detected.

That is, since an attacker does not know the locations of key qubit pairs and verification qubit pairs in transmission qubit pairs, the attacker may also attack verification qubits other than key qubits, and thus reveal his or her existence during a procedure of verification between the multi-user quantum key distribution apparatus 100 and the quantum key client device 200.

The memory 120 may store information about the generated transmission qubit pairs.

Here, the memory 120 may store the arrangement locations of the key qubit pairs and the verification qubit pairs arranged in each of the transmission qubit pairs.

The qubit transmission unit 108 may transmit the generated transmission qubit pairs to the quantum key client device 200 through quantum channels 312 and 313.

The classical signal transmission/reception unit 110 may verify the security of the quantum channels 312 and 313 through a classical channel 315 using the verification qubit pairs.

Here, the classical signal transmission/reception unit 110 may disclose information about c pairs of verification qubits, generated to verify the security of the quantum channels 312 and 313, to the quantum key client device 200 through the classical channel 315.

In this case, when the security of the quantum channels has been verified, the classical signal transmission/reception unit 110 may disclose the generation basis of n key qubit pairs to the quantum key client device 200 through the classical channel 315 in order to decode the shared key.

Procedures such as the reception of transmission qubit pairs, the measurement of the received transmission qubit pairs, the verification of security of quantum channels, and the decoding of the shared key, which are performed by the quantum key client device 200, may be implemented by the following components.

The quantum key client device 200 includes a quantum random number generation unit 203, a qubit measurement unit 204, a measurement result processing unit 206, a classical signal transmission/reception unit 210, and memory 220.

The qubit measurement unit 204 may measure two respective qubits forming each of transmission qubit pairs, received from the multi-user quantum key distribution apparatus 100 through the quantum channels 312 and 313, based on two different measurement bases.

The qubit measurement unit 204 may receive transmission qubit pairs from the multi-user quantum key distribution apparatus 100 through the quantum channels 312 and 313.

Here, the qubit measurement unit 204 may receive the key qubit pairs and the verification qubit pairs arranged in each of the transmission qubit pairs from the multi-user quantum key distribution apparatus 100.

Further, the qubit measurement unit 204 may measure the received transmission qubit pairs in different measurement bases.

For example, the qubit measurement unit 204 may measure two qubits forming each of transmission qubit pairs in a rectilinear basis ($a_i^l=0$) and in a diagonal basis ($a_i^l=1$). Here, the superscript of $l \in \{1, 2\}$ denotes the measurement sequence of two qubits forming an i-th pair.

The qubit measurement unit 204 may randomly select the sequence of a rectilinear measurement basis and a diagonal measurement basis using the quantum random number generation unit 203, and may then measure the qubits.

The quantum random number generation unit 203 may randomly select the sequence of two measurement bases. For example, one of the two measurement bases $[a_i^1=0, a_i^2=1]$ and $[a_i^1=1, a_i^2=0]$ may be randomly selected for the i-th qubit pair and may be used for measurement.

The qubit measurement unit 204 may measure the states of two qubits forming each pair both in the rectilinear basis and in the diagonal basis by setting the measurement sequence of the rectilinear basis and the diagonal basis differently depending on the quantum random number generation unit 203.

The qubit measurement values of each transmission qubit pair, measured by the qubit measurement unit 204, for example, in a rectilinear basis ($a_i^l=0$) and a diagonal basis ($a_i^l=1$), may be ($O_{i0}, O_{i1}$).

$O_{i0}$ may be the measurement value in the rectilinear basis and $O_{i1}$ may be the measurement value in the diagonal basis.

A superscript l of the base notation $a_i^l$ has a value of 1 or 2, which may be the sequence of the measurement bases.

A subscript b of the measurement notation $O_{ib}$ has a value of 0 or 1, which may be the result of measurement in the rectilinear basis or the diagonal basis.

That is, the qubit measurement unit 204 may randomly select the sequence of measurement bases in relation to whether to first measure the qubits in the rectilinear basis ($a_i^1=0$) and subsequently measure the qubits in the diagonal basis ($a_i^2=1$) or whether to first measure the qubits in the diagonal basis ($a_i^1=1$) and subsequently measure the qubits in the rectilinear basis ($a_i^2=0$), based on the output of the quantum random number generation unit 203, and may then perform measurement in the selected sequence.

That is, the relationship $a_i^1 \neq a_i^2$ may be satisfied.

Therefore, the qubit measurement unit 204 may randomly select the sequence of the measurement bases ($[a_i^1=0, a_i^2=1]$ or $[a_i^1=1, a_i^2=0]$) using the quantum random number generation unit 203.

Among a total of 12 verification qubit pairs shown in FIGS. 3A and 3B, four pairs are prepared in the same basis ($[|0\rangle,|1\rangle]$, $[|1\rangle,|0\rangle]$, $[|+\rangle,|-\rangle]$, $[|-\rangle,|+\rangle]$), and thus at least one of the measurement results of two qubits forming each verification qubit pair may be used to verify channels. However, since, in the case of the remaining eight pairs, two qubits forming each pair are prepared in different bases, the probability that the measurement basis randomly selected by the quantum key client device 200 and the basis of the verification qubit pair transmitted by the multi-user quantum key distribution apparatus 100 will be identical to each other may be ½.

That is, the multi-user quantum key distribution apparatus 100 prepares ⅔ of the verification qubit pairs in different bases, where the probability that these verification qubit pairs may be used for the verification of the channels (i.e. the probability that the generation basis of the multi-user quantum key distribution apparatus 100 will be identical to the measurement basis of the quantum key client device 200) is ½. Further, for ⅓ of a total number of verification qubit pairs, two quantum states forming a pair are prepared in the same basis, and thus the verification of channels may be performed at a probability of 100% in the measurement basis prepared by the quantum key client device 200. In summary, among a total of c verification qubit pairs, $$c \times \frac{2}{3} = \frac{2}{3}c$$

pairs may be successfully used to verify channels.

When this is probabilistically analyzed, verification qubit pairs corresponding to 66.6% of the total verification qubit pairs may be successfully used to verify channels. Compared to a conventional BB84-based quantum key distribution technique in which verification qubits exhibit a success rate of 25% in channel verification, the technique used in the present invention exhibits verification efficiency that is more than twice as high as the conventional technique.

Further, the qubit measurement unit 204 may deliver qubit measurement values $(O_{i0}, O_{i1})$ including both $O_{i0}$, which are result values obtained by measuring qubits, arranged in each transmission qubit pair, for example, in a rectilinear basis, and $O_{i1}$, which are result values obtained by measuring the qubits, for example, in a diagonal basis, to the measurement result processing unit 206.

The measurement result processing unit 206 may store the received qubit measurement values $(O_{i0}, O_{i1})$ in the memory 220.

The classical signal transmission/reception unit 210 may verify the security of quantum channels 312 and 313 through the classical channel 315 using the transmission qubit pairs.

The multi-user quantum key distribution apparatus 100 may disclose information about c verification qubit pairs, generated to verify the security of the quantum channels 312 and 313, to the quantum key client device 200 through the classical channel 315.

That is, the classical signal transmission/reception unit 110 of the multi-user quantum key distribution apparatus 100 may disclose the states of verification qubits included in the transmission qubit pairs, the arrangement locations of the verification qubits, and a generation basis $a_j$ used for the generation of the verification qubits to the classical signal transmission/reception unit 210 of the quantum key client device 200 through the classical channel 315.

Here, the measurement result processing unit 206 may determine, based on a comparison, whether verification qubit states prepared by the quantum key distribution apparatus 100 in the same basis $(a_j^l = a_j)$, among the qubit measurement values $(O_{j0}, O_{j1})$ and $(O_{j1}, O_{j0})$ stored in the memory 220, are identical to values measured by the quantum key client device 200, based on the states of verification qubits, the arrangement locations of the verification qubits, and the generation basis $a_j$ of the verification qubits, which are disclosed by the multi-user quantum key distribution apparatus 100 through the classical channel 315.

That is, the measurement result processing unit 206 may determine, based on a comparison, whether measurement values in the measurement basis identical to the generation basis at the locations corresponding to the arrangement locations of verification qubits in transmission qubit pairs, among the qubit measurement values stored in the memory 220, are identical to the states of verification qubits disclosed by the multi-user quantum key distribution apparatus 100, using bit values and generation basis corresponding to the arrangement locations of verification qubits in the transmission qubit pairs disclosed through the classical channel 315.

The measurement result processing unit 206 may verify that the quantum channels 312 and 313 are secure if the states of the verification qubits are identical to the measurement values as a result of the determination.

For example, whether intervention by an attacker is present may be taken into consideration so as to analyze security. The attacker may randomly select a measurement basis and perform measurement, as in the case of the quantum key client device 200, in order to find a key value, and may then resend the qubits to the quantum key client device 200. This attack method is referred to as an "intercept and resend attack".

The probability that a measurement basis randomly selected by the attacker will be identical to that of the quantum key client device 200 is ½. On the other hand, the probability that the measurement basis will be different from that of the quantum key client device 200 is $$1 - \frac{1}{2} = \frac{1}{2}.$$

The probability that the measurement result value will be different from the qubit state sent by the multi-user quantum key distribution apparatus 100 due to the difference in the measurement basis of the attacker is ½. In summary, intervention by the attacker causes an error of ¼ for a verification qubit pair, and thus the detection rate of attacker intervention in the technique of the present invention in which the number of verification qubit pairs is c, may be represented by the following Equation (4):

$$P_D = 1 - \left(\frac{3}{4}\right)^c \tag{4}$$

In Equation (4), when c is increased, the detection rate may converge on '1'. For a detection rate of 0.999999, the number of verification qubits required is about 72 (c=72 pairs).

The security of the present invention depends on non-orthogonality between quantum states. Qubits forming key qubit pairs do not satisfy non-orthogonality therebetween. However, when those qubits are combined with verification qubit pairs satisfying non-orthogonality between qubits forming each pair, non-orthogonality between pairs, as well as non-orthogonality between the qubits forming each pair, may also be satisfied.

Further, when the security has been verified, the multi-user quantum key distribution apparatus 100 may disclose the preparation bases of key qubit pairs, used in the remaining n key qubit pairs of the transmission qubit pairs, to the quantum key client device 200 through the classical channel 315.

That is, the classical signal transmission/reception unit 110 of the multi-user quantum key distribution apparatus 100 may disclose the arrangement locations of key qubit pairs and generation bases $l_i$ used for the generation of the key qubit pairs to the classical signal transmission/reception unit 210 of the quantum key client device 200 through the classical channel 315.

Here, the measurement result processing unit 206 may select one from among qubit measurement values $(O_{i0}, O_{i1})$, stored in the memory 220 in the same basis $(a_i^l = a_i)$, based on the arrangement locations of the key qubit pairs and the generation bases of the key qubit pairs, which are disclosed by the multi-user quantum key distribution apparatus 100 through the classical channel 315, and may decode the selected qubit measurement value into a key bit of a shared key.

The measurement result processing unit 206 may decode the key bit string using the measurement result values in a measurement basis identical to the generation basis.

Therefore, the present invention determines whether there is intervention by an attacker by performing the verification of verification qubit pairs in advance, and thereafter performs decoding of the key qubit pairs, thus providing secure key distribution.

Referring to FIG. 4, it can be seen that a common shared key to be distributed to quantum key client devices 200 by the multi-user quantum key distribution apparatus 100 using the quantum random number generation unit 104, and the configuration of transmission qubit pairs to be received by respective users, are illustrated.

As shown in FIG. 4, $\sigma_z^k$ indicates that k bits have been prepared in a rectilinear basis, and $\sigma_x^k$ indicates that k bits have been prepared in a diagonal basis.

For example, $\sigma_x^1$ may be the qubit pair $(|-\rangle,|-\rangle)$. D may be one of 12 verification qubit pairs shown in FIGS. 3A and 3B. Verification qubit pairs may be randomly inserted into key qubit pairs, thus enabling intervention by an attacker into a channel to be detected. Therefore, since an attacker does not know the locations of verification qubits and attacks the verification qubit pairs, the existence of the attacker may be revealed during a procedure of verification between the multi-user quantum key distribution apparatus 100 and the quantum key client devices 200.

Referring to FIG. 5, it can be seen that the multi-user quantum key distribution apparatus 100 delivers transmission qubit pairs to a plurality of quantum key client devices in order to distribute the shared key generated by the quantum random number generation unit 104 to the quantum key client devices.

Figure 6:
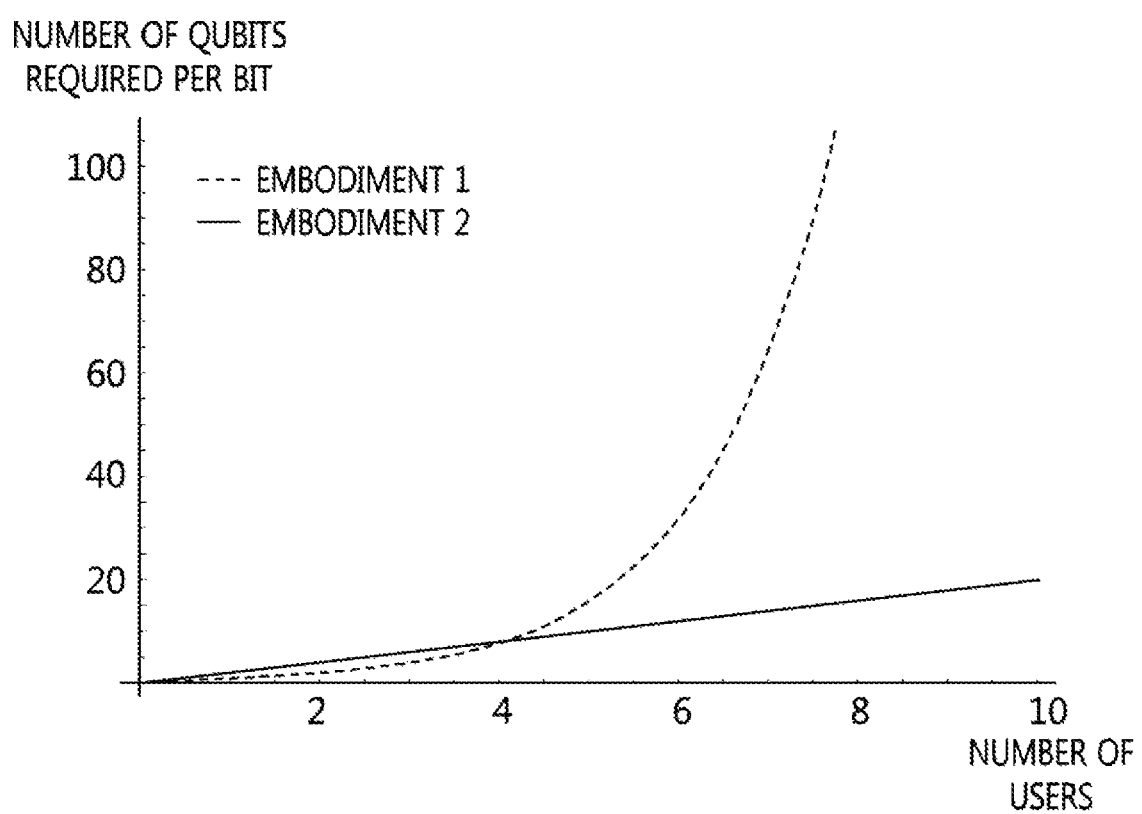
FIG. 6 is a graph showing a comparison in key distribution efficiency versus the number of users according to an embodiment of the present invention.

FIG. 6 is a graph showing a comparison in key distribution efficiency versus the number of users according to an embodiment of the present invention.

Referring to FIG. 6, the key distribution efficiency versus the number of users according to the embodiment of the present invention is compared with BB84 based multi-user quantum key distribution technique.

The multi-user quantum key distribution apparatus 100 may generate a total of 2 m qubits so as to securely transmit a single bit to m users and may transmit the 2 m qubits to the quantum key client devices 200.

A conventional BB84-based quantum key distribution technique corresponding to embodiment 1 transmits a single qubit per bit, but the number of qubits to be transmitted is theoretically doubled in order to transmit the same key to two users. In order to transmit the same key to three users, the number of qubits is increased fourfold. That is, according to embodiment 1, if the number of users who desire to share the same key is m, the number of qubits required to share one bit for the same key is $2^{m-1}$.

Further, according to embodiment 2 of the present invention, the number of qubits required to share one bit is 2 m, and thus embodiment 2 may have advantages in terms of expense and efficiency as the number of network users is increased, compared to embodiment 1.

That is, the BB84-based quantum key distribution technique is characterized in that a key distributor intends to distribute a random key only to one user. For multi-user communication, when the number of key distribution targets is extended to two or more, the efficiency of distribution of the same random key is greatly decreased. The key distribution efficiency may be defined by the following Equation (5):

$$Eff_{key} = \frac{N_{bit}}{N_{qubit}} \tag{5}$$

where $N_{bit}$ denotes the total number of bits to be distributed, and $N_{qubit}$ denotes the total number of qubits to be used. When the BB84-based quantum key distribution technique exhibits ¼ efficiency when a key is distributed to one user, it exhibits ⅛ efficiency when the key is distributed to two users and 1/16 efficiency when the key is distributed to three users. When this relationship is normalized, the key distribution efficiency of the BB84-based multi-user quantum key distribution technique may be defined by the following Equation (6):

$$Eff_{key}^{BB84} = \left(\frac{1}{2}\right)^{m+1} \tag{6}$$

where m denotes the number of users who desire to be provided with the same key.

Therefore, the present invention may provide constant efficiency regardless of the number of users m to whom the key is desired to be distributed, as given by the following Equation (7):

$$Eff_{key}^{presentinvention} = \frac{1}{4} \tag{7}$$

Therefore, it can be seen that, as shown in Equations (6) and (7) and in FIG. 6, when the number of network users is four or more, the technique in embodiment 2 proposed in the present invention has higher efficiency than that of the conventional BB84-based quantum key distribution technique in embodiment 1.

Figure 7:
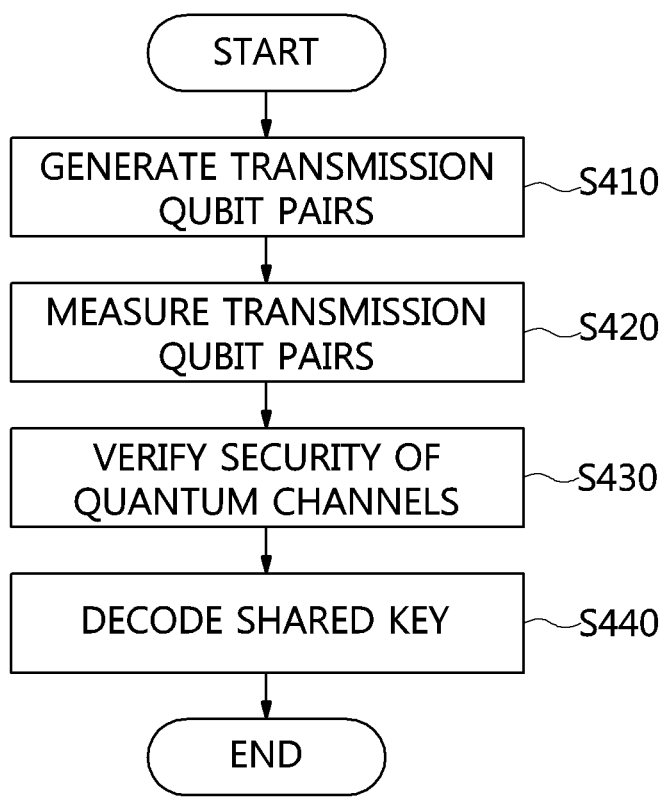
FIG. 7 is an operation flowchart illustrating a method for quantum key distribution according to an embodiment of the present invention.
Figure 8:
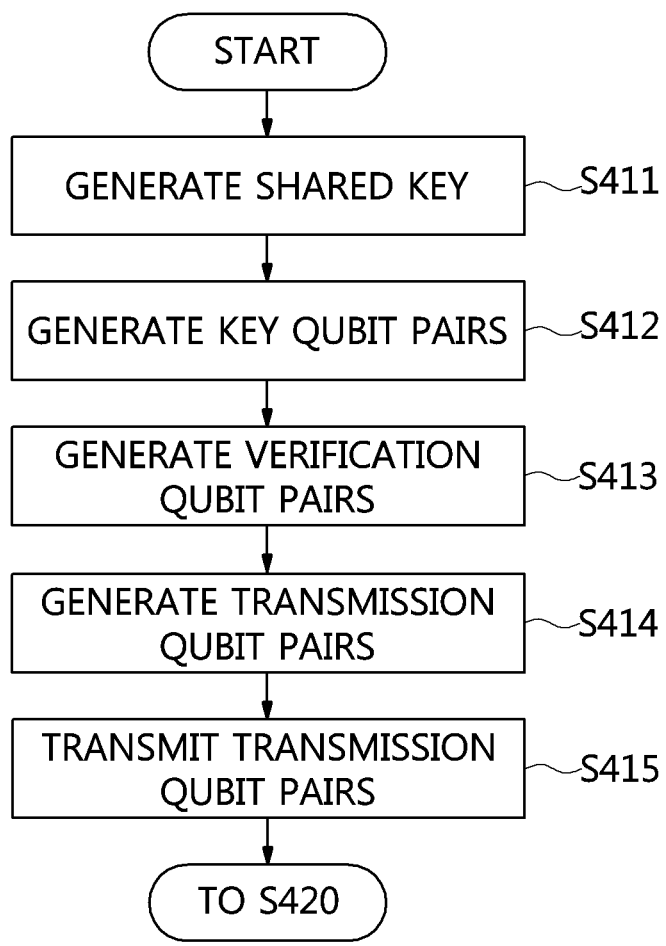
FIG. 8 is an operation flowchart illustrating in detail an example of the transmission qubit pair generation step shown in FIG. 7.
Figure 9:
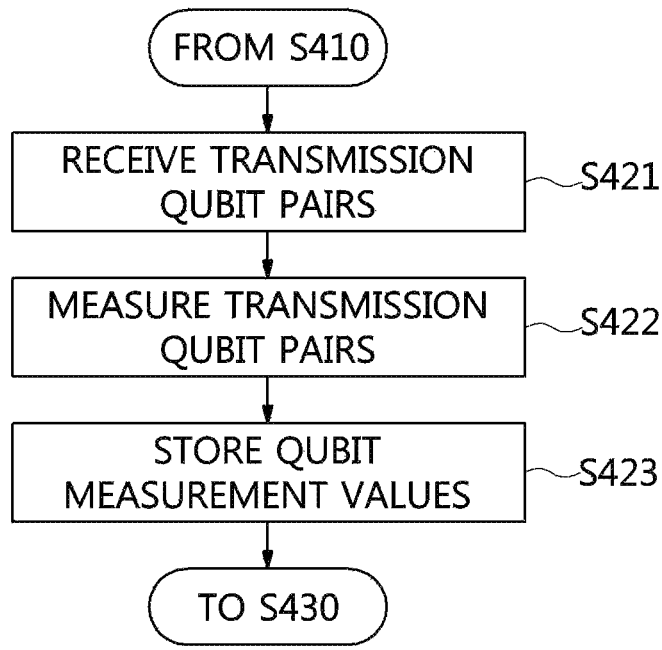
FIG. 9 is an operation flowchart illustrating in detail an example of the transmission qubit pair measurement step shown in FIG. 7.
Figure 10:
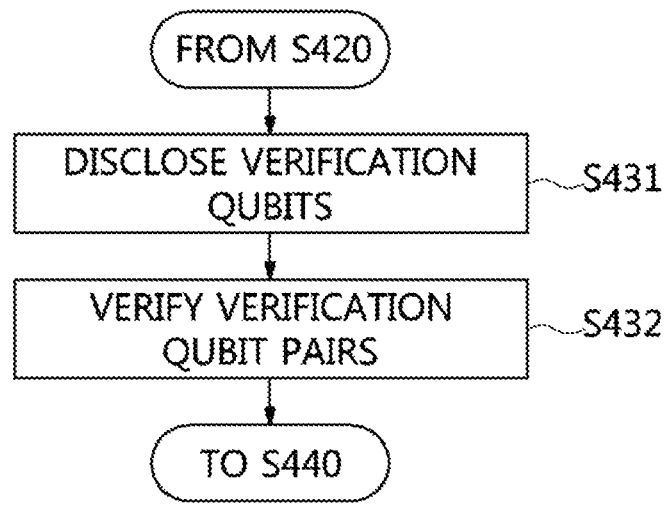
FIG. 10 is an operation flowchart illustrating in detail an example of the quantum channel security verification step shown in FIG. 7.
Figure 11:
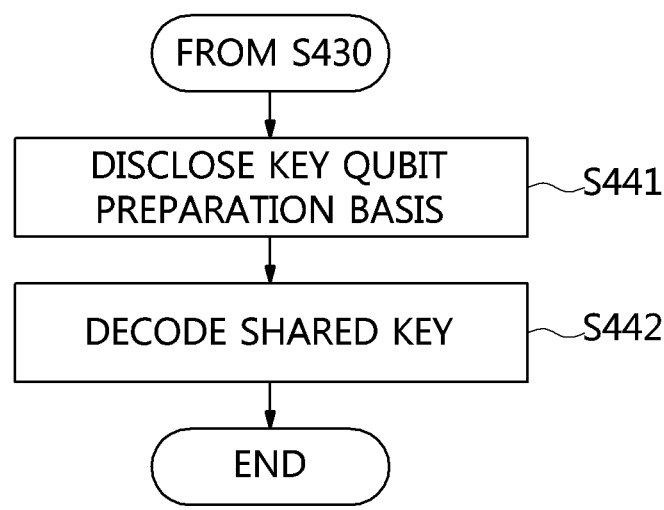
FIG. 11 is an operation flowchart illustrating in detail an example of the shared key decoding step shown in FIG. 7.

FIG. 7 is an operation flowchart illustrating a method for quantum key distribution according to an embodiment of the present invention. FIG. 8 is an operation flowchart illustrating in detail an example of the transmission qubit pair generation step shown in FIG. 7. FIG. 9 is an operation flowchart illustrating in detail an example of the transmission qubit pair measurement step shown in FIG. 7. FIG. 10 is an operation flowchart illustrating in detail an example of the quantum channel security verification step shown in FIG. 7. FIG. 11 is an operation flowchart illustrating in detail an example of the shared key decoding step shown in FIG. 7.

Referring to FIG. 7, the method for the quantum key distribution according to the embodiment of the present invention may first generate transmission qubit pairs at step S410.

Referring to FIG. 8, at step S410, a shared key may be generated at step S411.

That is, step S411 is configured such that a key bit string of the shared key to be distributed to the quantum key client device 200 may be randomly generated using the quantum random number generation unit 104.

Further, at step S410, key qubit pairs may be generated at step S412.

That is, at step S412, the key qubit pairs may be generated based on the key bit string of the shared key.

In detail, at step S412, a pair of two identical key qubits ($|\psi\rangle_{k_i}, |\psi\rangle_{k_i}$) may be generated for one bit. The generated key qubit pair may be chiefly separated into two types according to the generation basis. When the generation basis is a rectilinear basis, the qubits capable of being generated may be $|0\rangle$ and $|1\rangle$, and when the generation basis is a diagonal basis, qubits capable of being generated may be $|+\rangle$ and $|-\rangle$.

That is, at step S412, key qubit pairs, each including two identical key qubits, may be generated for each key bit in the key bit string.

Here, at step S412, two identical key qubits included in each key qubit pair may be determined based on the key value of each key bit and the generation basis corresponding to any one of the rectilinear basis and the diagonal basis.

In order to share a key value of '0' in a key bit, the multi-user quantum key distribution apparatus 100 may prepare a key qubit pair of ($|0\rangle, |0\rangle$) or ($|+\rangle, |+\rangle$) and transmit the key qubit pair to the quantum key client device 200. In order to share a key value of '1' in a key bit, the multi-user quantum key distribution apparatus 100 may prepare a key qubit pair of ($|1\rangle, |1\rangle$) or ($|-\rangle, |-\rangle$) and transmit the key qubit pair to the quantum key client device 200.

In this case, at step S412, the arrangement sequence of the generated key qubit pairs may be determined depending on the sequence of arrangement of key bits in the key bit string.

Further, at step S410, verification qubit pairs may be generated at step S413.

That is, at step S413, the verification qubit pairs may be generated.

At step S413, the number of transmission qubit pairs desired to be transmitted is greater than the number of key bits, and the number of verification qubit pairs to be generated may be determined using the difference between the number of transmission qubit pairs and the number of key bits.

In this case, when the length of a shared key that is desired to be shared is n and the number of transmission qubit pairs to be transmitted is N, as given in Equation (1), the relationship N>n may be satisfied. Here, the difference c between N and n (N−n=c) may be the number of verification qubit pairs which are used to verify the security of channels.

Here, at step S413, c verification qubit pairs may be generated.

Here, as shown in Equation (2), $|\psi\rangle_{d_{2j-1}}$ or $|\psi\rangle_{d_{2j}} \in \{|0\rangle, |1\rangle, |+\rangle, |-\rangle\}$ may be satisfied.

That is, unlike the key qubit pair ($|\psi\rangle_{k_i}, |\psi\rangle_{k_i}$) in Equation (1), for two verification qubits forming each of c verification qubit pairs, each generated using 2c qubits, different states and different basis states may be prepared. These may be given in the above Equation (3) and the Table 1.

Referring to FIGS. 2, 3A and 3B, examples of the configuration of key qubit pairs and verification qubit pairs according to an embodiment of the present invention may be illustrated.

Further, at step S410, transmission qubit pairs may be generated at step S414.

At step S414, the transmission qubit pairs may be generated by randomly arranging respective verification qubit pairs at any one of arrangement locations respectively adjacent to the key qubit pairs and arrangement locations respectively adjacent to the previously arranged verification qubit pairs.

Also, at step S414, information about the generated transmission qubit pairs may be stored in the memory 120.

Also, at step S414, the arrangement locations of the key qubit pairs and the verification qubit pairs arranged in each transmission qubit pair may be stored in the memory 120.

Further, at step S410, the transmission qubit pairs may be transmitted at step S415.

That is, at step S415, the transmission qubit pairs generated by the multi-user quantum key distribution apparatus 100 may be transmitted to the quantum key client device 200 through the quantum channels 312 and 313.

Meanwhile, the multi-user quantum key distribution method according to the embodiment of the present invention may measure the transmission qubit pairs at step S420.

Referring to FIG. 9, at step S420, the transmission qubit pairs are received at step S421.

That is, at step S421, the quantum key client device 200 may receive the transmission qubit pairs from the multi-user quantum key distribution apparatus 100 through the quantum channels 312 and 313.

In detail, at step S421, key qubit pairs and verification qubit pairs arranged in each transmission qubit pair may be received from the multi-user quantum key distribution apparatus 100 in the sequence of arrangement.

Also, at step S420, the transmission qubit pairs may be measured at step S422.

That is, at step S422, each of the received transmission qubit pairs may be measured in different measurement bases based on signal of the quantum random number generation.

More specifically, at step S422, qubits forming each transmission qubit pair may be measured by randomly selecting the sequence of a rectilinear measurement basis and a diagonal measurement basis using the quantum random number generation unit 203.

For example, at step S422, the quantum key client device 200 may measure two qubits forming each of the transmission qubit pairs in the rectilinear basis ($a_i^l=0$) and in the diagonal basis ($a_i^l=1$). Here, the superscript of $l \in \{1, 2\}$ denotes the measurement sequence of two qubits forming an i-th pair.

At step S422, the qubits may be measured by randomly selecting the sequence of the rectilinear measurement basis and the diagonal measurement basis using the quantum random number generation unit 203.

In detail, at step S422, two qubits forming each transmission qubit pair may be sequentially measured based on the sequentially arranged measurement bases by selecting the sequence of the measurement bases.

In this case, at step S422, the states of two qubits forming each pair may be measured both in the rectilinear basis and in the diagonal basis by setting the measurement sequence of the rectilinear basis and the diagonal basis differently depending on the quantum random number generation unit 203.

Here, an example of the qubit measurement values of the transmission qubit pair may be ($O_{i0}, O_{i1}$).

$O_{i0}$ may be the measurement value in the rectilinear basis, and $O_{i1}$ may be the measurement value in the diagonal basis.

The subscript b in measurement notation $O_{ib}$ may have a value of 0 or 1, which may be the result of measurement in the rectilinear basis or the diagonal basis.

That is, at step S422, whether to first measure the qubits in the rectilinear basis ($a_i^1=0$) and subsequently measure the qubits in the diagonal basis ($a_i^2=1$), or whether to first measure the qubits in the diagonal basis ($a_i^1=1$) and subsequently measure the qubits in the rectilinear basis ($a_i^2=0$) may be randomly selected by the quantum random number generation unit 203 of the quantum key client device 200, after which measurement may be performed.

That is, the relationship $a_i^1 \neq a_i^2$ is satisfied.

Therefore, at step S422, the sequence of the measurement bases ([$a_i^1=0$, $a_i^2=1$] or [$a_i^1=1$, $a_i^2=0$]) may be randomly selected using the quantum random number generation unit 203.

Further, at step S420, the qubit measurement values may be stored at step S423.

That is, at step S423, the qubit measurement values ($O_{i0},O_{i1}$) or ($O_{i1},O_{i0}$) including result values $O_{i0}$, obtained by measuring qubits arranged in each transmission qubit pair in the rectilinear basis, and result values $O_{i1}$, obtained by measuring the qubits in the diagonal basis, may be delivered to the measurement result processing unit 206.

Here, at step S423, the measurement result processing unit 206 may store the received qubit measurement values ($O_{i0},O_{i1}$) or ($O_{i1},O_{i0}$) in the memory 220.

Further, the multi-user quantum key distribution method according to the embodiment of the present invention may verify the security of quantum channels at step S430.

Referring to FIG. 10, at step S430, verification qubits may be disclosed at step S431.

In detail, at step S431, the multi-user quantum key distribution apparatus 100 may disclose the locations of c verification qubit pairs, generated to verify the security of the quantum channels 312 and 313, to the quantum key client device 200 through the classical channel 315.

Here, at step S431, the classical signal transmission/reception unit 110 of the multi-user quantum key distribution apparatus 100 may disclose the states of verification qubits included in the transmission qubit pairs, the arrangement locations of the verification qubits, and a generation basis $a_j$ used for the generation of the verification qubits to the classical signal transmission/reception unit 210 of the quantum key client device 200 through the classical channel 315.

Further, at step S430, the verification qubit pairs may be verified at step S432.

In detail, at step S432, it is determined, based on a comparison, whether the qubit states prepared by the quantum key distribution apparatus 100 in the same basis ($a_j^l=a_j$), among the qubit measurement values ($O_{j0},O_{j1}$) or ($O_{j1},O_{j0}$) stored in the memory 220, are identical to values measured by the quantum key client device 200, based on the states of verification qubits, the arrangement locations of the verification qubits, and the generation basis $a_j$ of the verification qubits, which are disclosed by the multi-user quantum key distribution apparatus 100 through the classical channel 315.

In this regard, at step S432, the quantum key client device 200 may compare the quantum states and generation basis corresponding to the arrangement locations of the verification qubits in each transmission qubit pair, which are disclosed by the quantum key distribution apparatus 100 through the classical channel 315, with measurement values and measurement basis corresponding to the arrangement locations of verification qubits in each transmission qubit pair, among the qubit measurement values stored in the memory 220.

Here, at step S432, if it is determined that the qubit measurement values in the same basis in the verification qubit pairs are identical to the stored qubit measurement values, the quantum channels 312 and 313 may be verified to be secure.

If it is determined that the prepared quantum states and the qubit measurement value are identical to each other, the measurement result processing unit 206 may determine that the security of the quantum channels 312 and 313 has been verified.

Further, the multi-user quantum key distribution method according to the embodiment of the present invention may decode the shared key at step S440.

Referring to FIG. 11, at step S440, key qubit preparation bases may be disclosed at step S441.

That is, at step S441, when the security of the quantum channels has been verified, the multi-user quantum key distribution apparatus 100 may disclose the key qubit generation bases used in the remaining n key qubit pairs of the transmission qubit pair to the quantum key client device 200 through the classical channel 315.

Here, at step S441, the classical signal transmission/reception unit 110 of the multi-user quantum key distribution apparatus 100 may disclose the arrangement locations of the key qubit pairs and generation bases 1, used to generate the key qubit pairs to the classical signal transmission/reception unit 210 of the quantum key client device 200 through the classical channel 315.

Further, at step S440, the decoding of the shared key may be performed at step S442.

That is, at step S442, one of qubit measurement values ($O_{i0},O_{i1}$) stored in the memory 220 in the same basis ($a_i^l=a_i$) may be selected based on the arrangement locations of the key qubit pairs and the generation bases of the key qubit pairs, which are disclosed by the multi-user quantum key distribution apparatus 100 through the classical channel 315, and may then be decoded into the key bit string of the shared key.

Here, at step S442, the measurement result values in the same basis as the generation basis may be decoded into the key bit string of the shared key.

That is, the measurement result processing unit 206 may decode the measurement values in the measurement basis, in which the generation basis corresponding to the arrangement locations of the key qubit pairs in the transmission qubit pair disclosed through the classical channel 315 is identical to the generation basis corresponding to the arrangement locations in the transmission qubit pair, among the qubit measurement values stored in the memory 220, into the key bit string.

Therefore, the present invention may provide secure key distribution because the verification of verification qubit pairs is performed in advance to determine whether there is intervention by an attacker, after which the decoding of key qubit pairs is performed.

Figure 12:
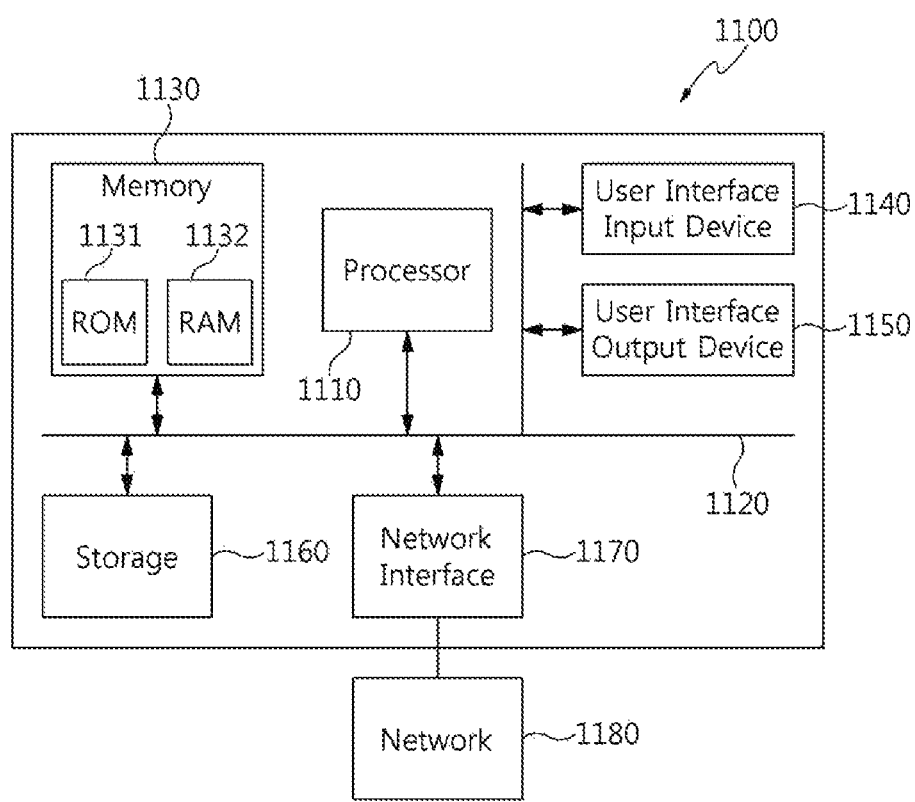
FIG. 12 is a block diagram showing a computer system according to an embodiment of the present invention.

FIG. 12 is a block diagram showing a computer system according to an embodiment of the present invention.

Referring to FIG. 12, the embodiment of the present invention may be implemented in a computer system 1100 such as a computer-readable storage medium. As shown in FIG. 12, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each of the processors 1110 may be a central processing unit (CPU) or a semiconductor device for executing processing instructions stored in the memory 1130 or the storage 1160. Each of the memory 1130 and the storage 1160 may be a volatile or nonvolatile storage medium. For example, the memory 1130 may include Read Only Memory (ROM) 1131 or Random Access Memory (RAM) 1132.

The present invention may distribute the same key to a plurality of users using a quantum technique, the security of which has been proven.

Further, the present invention may guarantee constant key distribution efficiency, regardless of the number of users to whom the same key is to be distributed.

Furthermore, the present invention may distribute the same key to a plurality of users in an actual quantum key distribution environment based on consistent efficiency and facilitation of implementation.

As described above, in the apparatus and method for multi-user quantum key distribution according to the present invention, the configurations and schemes in the above-described embodiments are not limitedly applied, and some or all of the above embodiments can be selectively combined and configured so that various modifications are possible.

What is claimed is:

1. A method for multi-user quantum key distribution, the method being performed using a multi-user quantum key distribution apparatus and a plurality of quantum key client devices, the method comprising:
generating, by the multi-user quantum key distribution apparatus, transmission qubit pairs based on a key bit string of a shared key which is to be distributed to each of the quantum key client devices;
measuring, by each of the quantum key client devices, the transmission qubit pairs, received from the multi-user quantum key distribution apparatus through a quantum channel, based on a measurement basis;
verifying security of the quantum channel using verification qubit pairs of the transmission qubit pairs; and
if the security has been verified, decoding qubit measurement values of the transmission qubit pairs into the shared key,
wherein generating the transmission qubit pairs comprises:
generating key qubit pairs based on the key bit string of the shared key;
generating verification qubit pairs by selecting one or more of quantum states having non-orthogonality therebetween; and
generating the transmission qubit pairs based on the key qubit pairs and the verification qubit pairs.

2. The method of claim 1, wherein generating the key qubit pairs is configured to generate key qubit pairs, each including two identical key qubits for each key bit in the key bit string.

3. The method of claim 2, wherein generating the key qubit pairs is configured to determine the two identical key qubits included in each key qubit pair based on both key values of the key bits and a generation basis corresponding to any one of a rectilinear basis and a diagonal basis.

4. The method of claim 3, wherein generating the key qubit pairs is configured to determine an arrangement sequence of the generated key qubit pairs depending on an arrangement sequence of the key bits in the key bit string.

5. The method of claim 4, wherein generating the verification qubit pairs is configured such that:
a number of transmission qubit pairs is greater than a number of key bits, and
a number of verification qubit pairs to be generated is determined using a difference between the number of transmission qubit pairs and the length of a shared key.

6. The method of claim 5, wherein generating the transmission qubit pairs based on the key qubit pairs and the verification qubit pairs is configured to generate the transmission qubit pairs by arranging the verification qubit pairs at any one of arrangement locations respectively adjacent to the key qubit pairs and arrangement locations respectively adjacent to previously arranged verification qubit pairs.

7. The method of claim 6, wherein generating the transmission qubit pairs based on the key qubit pairs and the verification qubit pairs is configured such that the multi-user quantum key distribution apparatus stores arrangement locations of the key qubit pairs and the verification qubit pairs arranged in each of the transmission qubit pairs.

8. The method of claim 7, wherein measuring the transmission qubit pairs comprises:
receiving the generated transmission qubit pairs through the quantum channel;
measuring two qubits forming each of the received transmission qubit pairs in different measurement bases; and
storing qubit measurement values of each of the transmission qubit pairs.

9. The method of claim 8, wherein receiving the generated transmission qubit pairs is configured such that the quantum key client device receives key qubit pairs and verification qubit pairs arranged in each of the transmission qubit pairs from the multi-user quantum key distribution apparatus in a sequence of arrangement of the key qubit pairs and the verification qubit pairs.

10. The method of claim 9, wherein measuring the two qubits forming each of the received transmission qubit pairs in different measurement bases is configured such that the quantum key client device measures each of the qubits of the received transmission qubit pair by using the rectilinear basis and the diagonal basis for each of the qubits of the transmission qubit pair.

11. The method of claim 10, wherein measuring the two qubits forming each of the received transmission qubit pairs in different measurement bases is configured to respectively measure the qubits of the received transmission qubit pair in any one of a sequence of the rectilinear basis-diagonal basis and a sequence of the diagonal basis-rectilinear basis by using the rectilinear basis and the diagonal basis.

12. The method of claim 11, wherein storing the qubit measurement values is configured such that the quantum key client device stores the qubit measurement values that include both result values obtained by measuring each transmission qubit pair in the rectilinear basis and result values obtained by measuring each transmission qubit pair in the diagonal basis.

13. The method of claim 12, wherein verifying the security is configured such that the multi-user quantum key distribution apparatus discloses at least one of arrangement locations of the verification qubits and a generation basis used to generate the verification qubits to the quantum key client device through a classical channel.

14. The method of claim 13, wherein verifying the security is configured such that the quantum key client device determines, based on a comparison, whether the measurement results, which are measured based on at least one of the disclosed the states of verification qubits, the arrangement locations of the disclosed verification qubits, and the generation basis of the disclosed verification qubits, are identical to values measured in a basis identical to a generation basis of the verification qubits, among qubit measurement values stored in the quantum key client device.

15. The method of claim 14, wherein verifying the security is configured to, if it is determined that the measurement results are identical to the measurement values, verify that the quantum channel is secure as a result of verification of security of the quantum channel.

16. The method of claim 15, wherein decoding the qubit measurement values is configured such that, if it is verified that the quantum channel is secure as a result of verification of security of the quantum channel, the multi-user quantum key distribution apparatus discloses at least one of arrangement locations of key qubit pairs included in the transmission qubit pair and a generation basis used to generate the key qubit pairs to the quantum key client device through the classical channel.

17. The method of claim 16, wherein decoding the qubit measurement values is configured such that, based on the disclosed arrangement locations of the key qubit pairs and the disclosed generation basis of the key qubit pairs, the quantum key client device decodes measurement result values in a measurement basis identical to the generation basis into the key bit string of the shared key.

18. An apparatus for multi-user quantum key distribution, comprising:
at least one processor;
a memory having instructions stored thereon, which, when executed by the at least one processor, cause the at least on processor to function as:
a quantum random number generation unit configured to generate a key bit string of a shared key to be distributed to each of a plurality of quantum key client devices, based on quantum states;
a qubit generation unit configured to generate key qubit pairs based on the key bit string of the shared key, to generate verification qubit pairs by selecting one or more of quantum states having non-orthogonality therebetween, and to generate transmission qubit pairs based on the key qubit pairs and the verification qubit pairs;
a qubit transmission unit configured to transmit the transmission qubit pairs to each of the quantum key client devices through a quantum channel; and
a classical signal transmission/reception unit configured to disclose information related to the transmission qubit pairs through a classical channel.

19. A quantum key client device comprising:
at least one processor;
a memory having instructions stored thereon, which, when executed by the at least one processor, cause the at least on processor to function as:
a qubit measurement unit configured to measure transmission qubit pairs, received from a multi-user quantum key distribution apparatus through a quantum channel, based on a measurement basis;
a quantum random number generation unit configured to select a sequence of the measurement bases based on quantum states;
a classical signal transmission/reception unit configured to receive pieces of information related to the transmission qubit pairs through a classical channel; and
a measurement result processing unit configured to determine, based on a comparison, whether the pieces of information related to the transmission qubit pairs are identical to qubit measurement values obtained by measuring the transmission qubit pairs, to verify security of the quantum channel, and to decode the qubit measurement values into a key bit string of a shared key to be distributed by the multi-user quantum key distribution apparatus.

* * * * *